Figure 1:
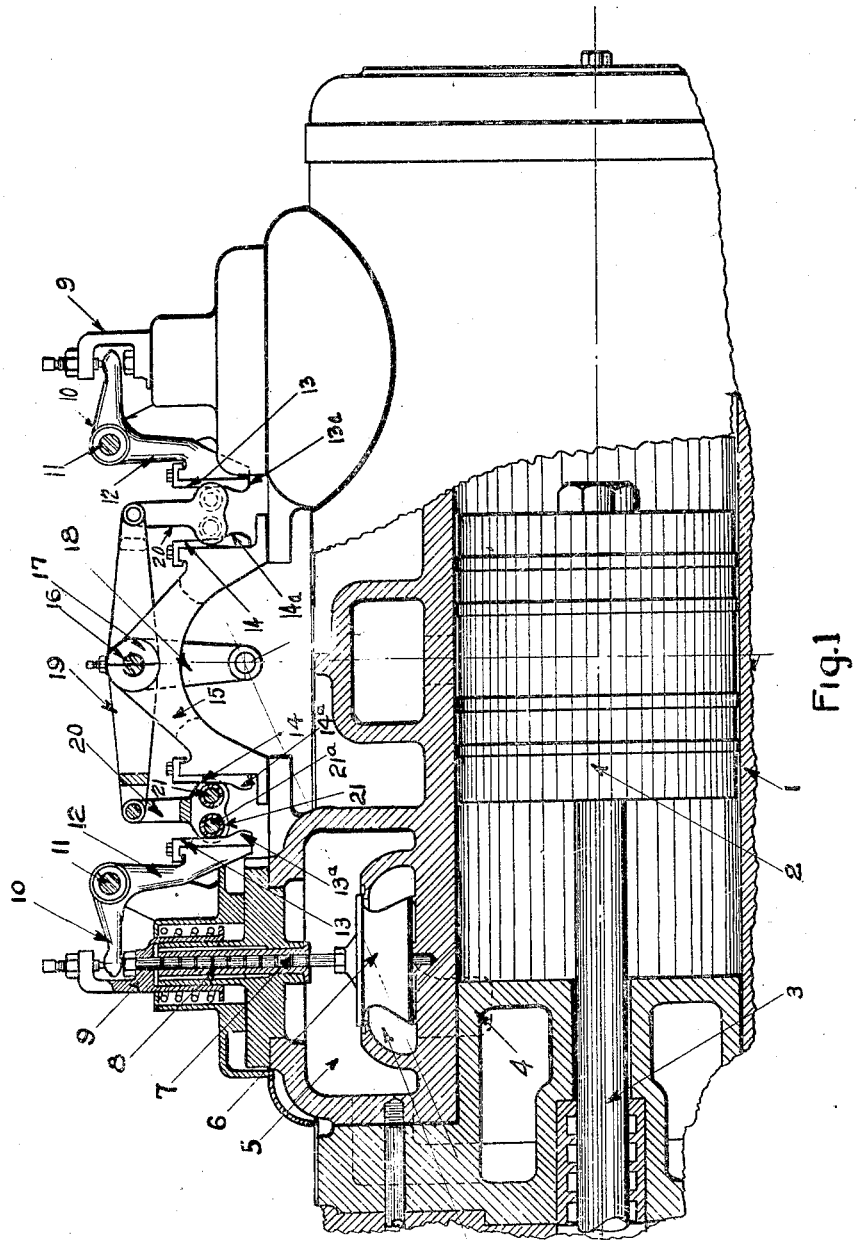

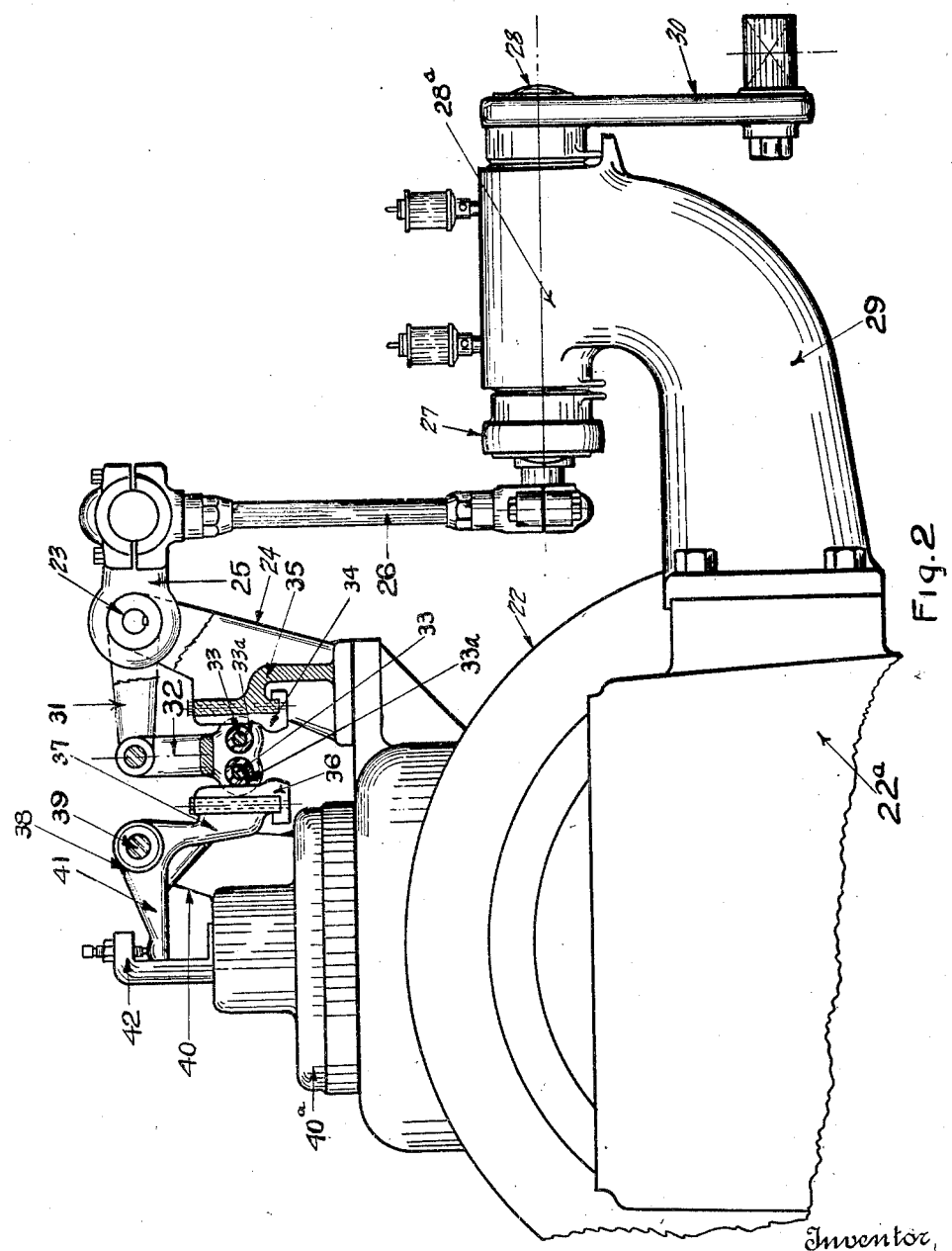

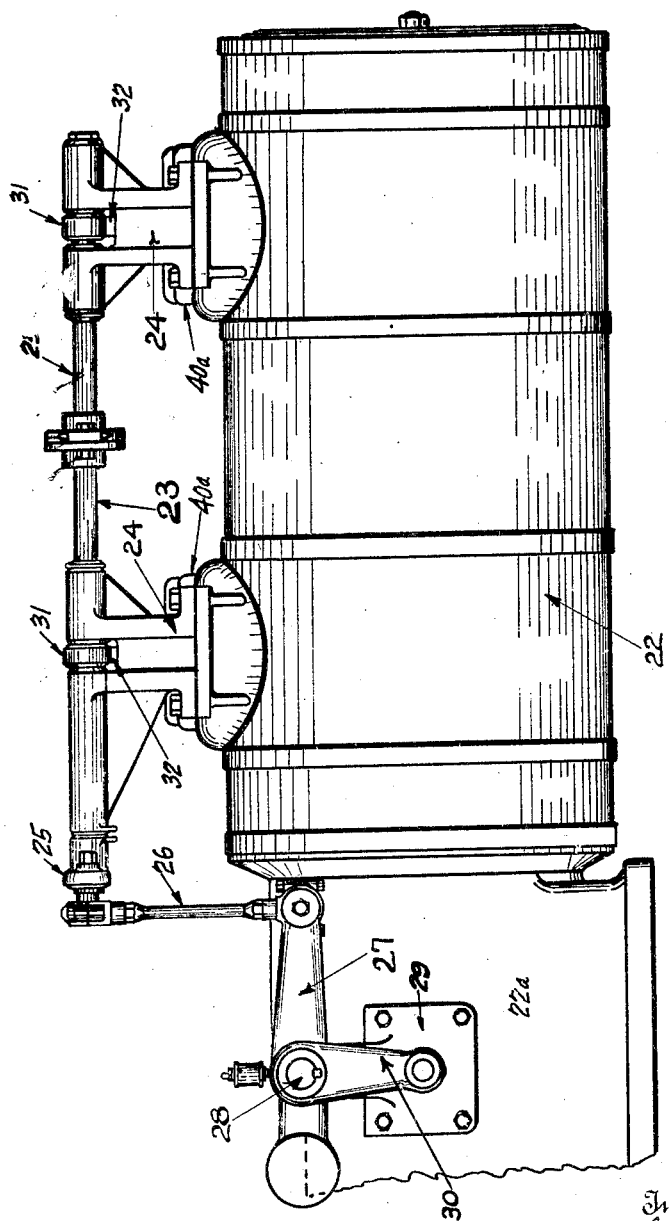

Patented Jan. 17, 1928.

1,656,573

UNITED STATES PATENT OFFICE.

ALLAN D. SKINNER, OF ERIE, PENNSYLVANIA, ASSIGNOR TO SKINNER ENGINE COMPANY, OF ERIE, PENNSYLVANIA, A CORPORATION OF PENNSYLVANIA.

ENGINE-VALVE GEAR.

Application filed November 24, 1922. Serial No. 602,983.

This invention is designed to improve valve gears involving a cam action. Such gears are commonly used for poppet valves but may be used with other types of valves. Where such valves are used for fluid-actuated engines such as steam engines it is desirable not only to open the valve quickly but to give the valve a wide opening so that the full steam pressure may be delivered to the cylinder as early as possible after the opening of the valve so as to utilize the full energy of the steam. From a practical stand-point the cam imposes limitations on this action in that the cam does not operate satisfactorily with an inclination much above thirty degrees and with a practical throw and this inclination it is difficult to get as rapid an opening and extent of opening of the valve as desired. The present invention is designed to obviate this difficulty.

The invention is illustrated in the accompanying drawings as follows:—

Fig. 1 shows a side elevation, partly in section, of a steam engine cylinder and valve gear mounted thereon.

Fig. 2 an end view of the cylinder with an alternative form of valve gear thereon.

Fig. 3 a side elevation of the same.

In the construction shown in Fig. 1, 1 marks the cylinder, 2 the piston, 3 the piston rod, 4 the inlet port, 5 the valve chest, 6 a valve controlling the port, the valve shown being of the poppet type, 7 a valve stem, 8 a stem guide, 9 a head mounted on the stem, 10 an arm of a bell crank lever operating on the head 9, 11 a rock shaft on which the bell crank lever is mounted, and 12 an opposing arm of a bell crank lever.

A cam 13 is mounted on the arm 12 of the bell crank lever having an inclination 13ª. A cam 14 having an inclination 14ª is faced directly opposite the cam 13. The cam 14 is mounted on a bridge frame 15 secured to the engine cylinder. A bearing 17 is formed in the bridge 15 and a rock shaft 16 journaled in this bearing. The rock shaft is actuated by a lever 18 which lever is connected to the governor or other valve actuating mechanism deriving its motion from the crank shaft (the connection not being shown). A lever 19 is fixed on the rock shaft 16 and links 20 are pivotally suspended from the ends of the lever 19. The links 20 carry cross heads 21 on which are mounted the rollers 21ª, these rollers engaging the opposing faces of the cams.

It will be noted there are two of the cross heads 21 which receive movement from the lever 19 and the valve mechanism just above described is duplicated for both ends of the engine.

It will be seen that as the cross head is forced downwardly by the rock lever 19, the rollers operating on the cams cumulate the effect of both upon the bell crank lever. Thus with a given inclination of cam the movement given to the bell crank may be doubled. In this way a very moderate inclination may be used thus obviating the difficulties arising from the use of cams with too steep an inclination and not only can a quicker valve opening be accomplished but it may be given a wider extent than is practical with a single cam.

In the alternative construction the broad idea of double and opposing cams is arranged in a lay shaft gear. In this construction the cylinder 22 carries a lay shaft 23, the lay shaft being journaled in brackets 24 mounted on the cylinder. A rock lever 25 is fixed on the lay shaft. A link 26 connects the rock lever 25 with a rock lever 27. The rock lever 27 is fixed on a rock shaft 28. The rock shaft 28 is carried in a bearing 28ª mounted on a bracket 29, the bracket being secured to the frame 22ª. A rock lever 30 is fixed on the shaft 28 and this rock lever is connected with the governor or other valve actuating device getting its motion from the engine. The construction shown in the patent issued to Le Grand Skinner, #1,255,476, dated Feb. 5th, 1918, may be used if desired. Rock levers 31 are fixed on the lay shaft opposite each valve. Links 32 are pivotally suspended on the ends of the rock levers 31 and cross heads 33 carry rollers 33ª which operate between the opposing cams 34 and 36, the cam 34 being mounted on a bracket 35 extending upwardly from the cylinder. The cam 36 is carried by the arm 37 of a bell crank lever 38. The bell crank lever is mounted on a shaft 39. The shaft 39 is journaled in a bracket 40 extending from the valve housing 40ª. The opposite arm 41 of the bell crank operates on a valve head 42, the valve construction being the same as that shown in Fig. 1. It will readily be seen that with the rocking of the lay shaft exactly the same cam action is affected to operate the valves as has been described with relation to the construction shown in Fig. 1.

What I claim as new is:—

1. In an engine valve gear, the combination of a cylinder; valves arranged at the ends of the cylinder; rock levers operating said valves; cams on said levers; cams opposing the cams on the rock levers; cross heads operating on said cams and cumulating the thrust of said cams on said rock levers; and levers operating on a common axis actuating said cross heads.

2. In an engine valve gear, the combination of a cylinder; valves arranged at the end of the cylinder; rock levers operating said valves; cams on said levers; cams opposing the cams on the rock levers; cross heads operating on said cams and cumulating the thrust of said cams on said rock levers; and levers operating on a common axis actuating said cross heads, said axes being at right angles to the axis of the cylinder and midway between the valves.

In testimony whereof I have hereunto set my hand.

ALLAN D. SKINNER.